United States Patent
Yun et al.

(10) Patent No.: US 10,848,837 B2
(45) Date of Patent: Nov. 24, 2020

(54) DEVICE AND METHOD FOR PROCESSING HIGH-DEFINITION 360-DEGREE VR IMAGE

(71) Applicant: ELECTRONICS AND TELECOMMUNICATIONS RESEARCH INSTITUTE, Daejeon (KR)

(72) Inventors: Kug Jin Yun, Daejeon (KR); Jun Young Jeong, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/492,289

(22) PCT Filed: Apr. 3, 2018

(86) PCT No.: PCT/KR2018/003882
§ 371 (c)(1),
(2) Date: Sep. 9, 2019

(87) PCT Pub. No.: WO2018/186646
PCT Pub. Date: Oct. 11, 2018

(65) Prior Publication Data
US 2020/0084516 A1 Mar. 12, 2020

(30) Foreign Application Priority Data
Apr. 3, 2017 (KR) .................. 10-2017-0043014

(51) Int. Cl.
*H04N 21/81* (2011.01)
*H04N 19/597* (2014.01)
(Continued)

(52) U.S. Cl.
CPC ......... *H04N 21/816* (2013.01); *H04N 13/161* (2018.05); *H04N 13/194* (2018.05); *H04N 19/597* (2014.11); *H04N 21/4728* (2013.01)

(58) Field of Classification Search
CPC .. H04N 21/816; H04N 19/597; H04N 13/194; H04N 13/161; H04N 21/4728;
(Continued)

(56) References Cited

U.S. PATENT DOCUMENTS

2004/0095385 A1  5/2004 Koo et al.
2014/0079126 A1  3/2014 Ye et al.
(Continued)

FOREIGN PATENT DOCUMENTS

KR  10-2012-0088507 A  8/2012
KR  10-2013-0024357 A  3/2013
(Continued)

OTHER PUBLICATIONS

"Virtual Reality—Prospects for DVB Delivery", *Report of the DVB CN Study Mission on Virtual Reality*, Jun. 2016 (64 pages in English).
(Continued)

*Primary Examiner* — Nam D Pham
(74) *Attorney, Agent, or Firm* — NSIP Law

(57) ABSTRACT

Disclosed is an apparatus and method of providing a high quality 360-degree VR image. A method of decoding a 360-degree VR image according to the present disclosure includes: receiving a bit stream including 360-degree VR image information; decoding information related to a 360-degree VR service from the bitstream; detecting a region of interest based on the information related to the 360-degree VR service; and providing to a user a 360-degree VR image for the region of interest.

21 Claims, 7 Drawing Sheets

(51) Int. Cl.
*H04N 13/194* (2018.01)
*H04N 13/161* (2018.01)
*H04N 21/4728* (2011.01)

(58) Field of Classification Search
CPC ......... H04N 21/2362; H04N 21/23439; H04N 21/234363; H04N 21/21805; H04H 20/72; H04H 20/76
See application file for complete search history.

(56) References Cited

U.S. PATENT DOCUMENTS

2014/0240452 A1  8/2014  Ki et al.
2018/0213202 A1* 7/2018  Kopeinigg ........... H04N 13/366

FOREIGN PATENT DOCUMENTS

| KR | 10-2015-0029461 A | 3/2015 |
|---|---|---|
| KR | 10-2015-0047225 A | 5/2015 |
| KR | 10-2016-0125708 A | 11/2016 |
| KR | 10-2017-0018352 A | 2/2017 |
| KR | 10-1713492 B1 | 3/2017 |
| WO | WO 2015/197815 A1 | 12/2015 |

OTHER PUBLICATIONS

El-Ganainy, Tarek, et al., "Streaming Virtual Reality Content.", *arXiv preprint arXiv:1612.08350*, Dec. 26, 2016 (pp. 1-8).
Son, Jang-Woo et al., "SHVC-based ROI Tile Parallel Processing for Mobile Virtual Reality", *Proceeding of the Winter Conference of Korea Institute of Information Scientists and Engineers*, 2016 (1 page in English and 3 pages in Korean).
International Search Report dated Jul. 13, 2018 in counterpart International Patent Application No. PCT/KR2018/003882 (2 pages in English and 2 pages in Korean).

* cited by examiner

FIG. 3

| syntax | bit | |
|---|---|---|
| VR_service_info() { | | (310) |
| VR_contents_ID | 8 | |
| VR_projectionType | 4 | |
| reserved | 4 | |
| Total_width | 16 | |
| Total_height | 16 | |
| Number_ROI | 8 | |
| } | | |

| syntax | bit | |
|---|---|---|
| VR_stream_info() { | | (320) |
| VR_contents_ID | 8 | |
| VR_totalview_present | 1 | |
| Reserved | 7 | |
| If(VR_totalview_present ==0) | | |
| Viewport_ID | 8 | |
| Initial_viewport_flag | 1 | |
| reserved | 7 | |
| RoI_x_startposition | 16 | |
| RoI_x_endposition | 16 | |
| RoI_y_startposition | 16 | |
| RoI_y_endposition | 16 | |
| } | | |

DEVICE AND METHOD FOR PROCESSING HIGH-DEFINITION 360-DEGREE VR IMAGE

CROSS REFERENCE TO RELATED APPLICATIONS

This application is a U.S. National Stage Application of International Application No. PCT/KR2018/003882, filed on Apr. 3, 2018, which claims the benefit under 35 USC 119(a) and 365(b) of Korean Patent Application No. 10-2017-0043014, filed on Apr. 3, 2017, in the Korean Intellectual Property Office, the entire disclosure of which is incorporated herein by reference for all purposes.

TECHNICAL FIELD

The present disclosure relates to a high quality 360-degree VR image processing apparatus and method. More particularly, the present disclosure relates to an apparatus and method of providing signaling information related to a high quality 360-degree VR broadcasting service, and providing a high quality 360-degree VR image for a region of interest of the user.

BACKGROUND ART

The introduction of digital broadcasting has changed the traditional broadcasting system where a viewer watches images transmitted from a broadcasting station to a form where a viewer watches desired contents by selecting them at a desired time. In addition, the development of broadband transmission technology may provide a broadcasting service providing realistic high image quality media with 4K or more (e.g., UHDTV, 3DTV, etc.) to viewers while overcoming bandwidth limitations.

360-degree virtual reality (VR) media is media providing to a viewer panoramic images so that the viewer can select a desired view, and recently, efforts to provide a 360-degree VR media service in convergence of broadcasting networks has been conducted. 360-degree VR media that is currently generally applied can simultaneously provide 4K or FHD VR media, so that a desired view or region of interest (RoI) of the viewer is provided to the viewer without any delay. However, there is problem in that a view played according to actual motion of the viewer is degraded in quality thereof. In addition, as another example, 360-degree VR service performing streaming for a region corresponding to viewer motion or based on view information of viewer selection may provide the corresponding view having relatively high quality, but a motion to photon (MTP) latency required for playing an image with high quality in response to user motion for the same becomes long.

As a method of providing 360-degree VR media, a method of recognizing panoramic video broadcasting service and providing a signaling method representing the video characteristic, a method of primarily transmitting a thumbnail image and transmitting, by a receiver, data of a specific region required based on the thumbnail, or a method of dividing a panoramic video into predetermined sub-regions and transmitting data of a sub-region selected by a user may be used. The above conventional methods purpose signaling, tiling, transmitting and synchronization methods for proving panoramic broadcasting service. However, providing 360-degree VR broadcasting service for a high quality 360-degree VR image based on user motion or user selection is difficult under a broadcasting network environment.

DISCLOSURE

Technical Problem

An object of the present disclosure is to provide a high quality 360-degree VR image processing apparatus and method.

Another object of the present disclosure is to provide an encoding apparatus and method of providing signaling information of a high quality 360-degree VR broadcasting service.

Still another object of the present disclosure is to provide a decoding apparatus and method of receiving signaling information of a high quality 360-degree VR broadcasting service.

Still another object of the present disclosure is to provide an encoding apparatus and method of providing a high quality 360-degree VR image for a region of interest of a user.

Still another object of the present disclosure is to provide a decoding apparatus and method of providing a high quality 360-degree VR image for a region of interest of a user.

It will be appreciated by persons skilled in the art that the objects that could be achieved with the present disclosure are not limited to what has been particularly described hereinabove and the above and other objects that the present disclosure could achieve will be more clearly understood from the following detailed description.

Advantageous Effects

According to the present disclosure, a high quality 360-degree VR image processing apparatus and method may be provided.

In addition, according to the present disclosure, an apparatus and method of providing signaling information of a high quality 360-degree VR broadcasting service may be provided.

In addition, according to the present disclosure, an apparatus and method of providing a high quality 360-degree VR image for a region of interest of a user may be provided.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

FIG. 3 is a view showing a signaling structure for 360-degree VR broadcasting service according to an embodiment of the present disclosure.

BEST MODE

Figure 1:
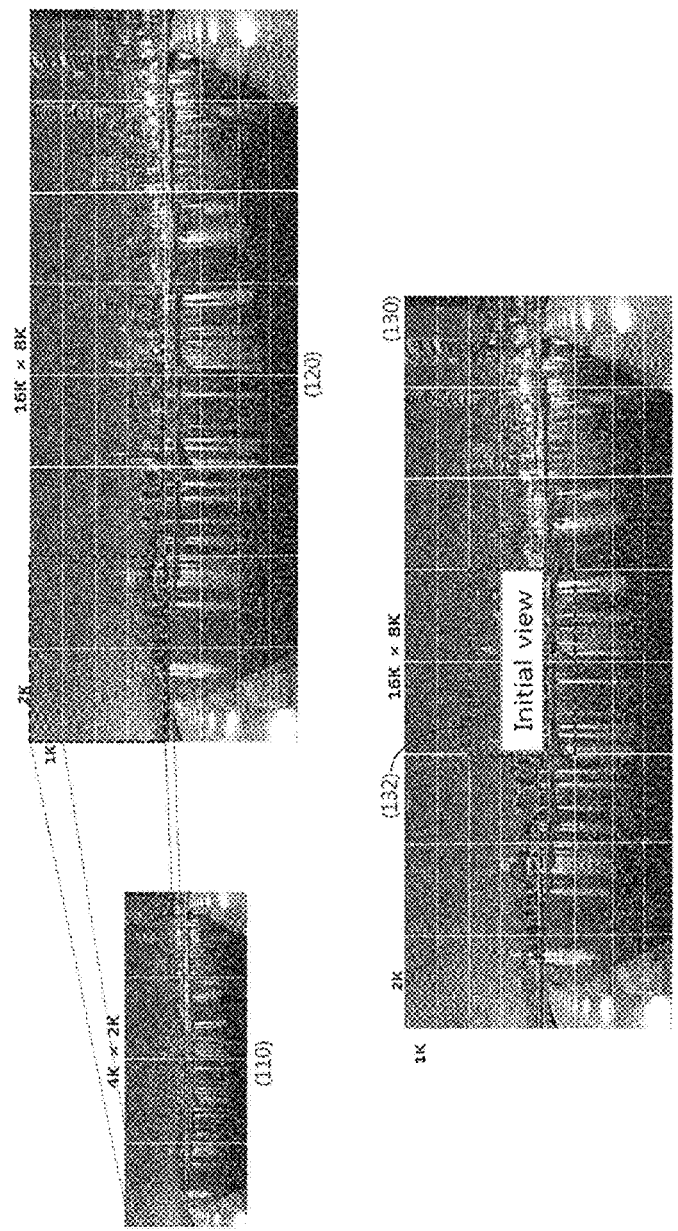
FIG. 1 is a view showing a scenario of providing a high quality 360-degree VR media service by using a broadcasting network according to an embodiment of the present disclosure.

According to an aspect of the present disclosure, there may be provided a method of decoding a 360-degree image, the method including: receiving a bitstream including 360-degree virtual reality (VR) image information; decoding information related to a 360-degree VR service from the bitstream; detecting a region of interest based on the information related to the 360-degree VR service; and providing a 360-degree VR image for the region of interest to a user.

According to another aspect of the present disclosure, there may be provided an apparatus for decoding a 360-degree image, wherein the apparatus receives a bitstream including 360-degree VR image information, decodes information related to a 360-degree VR service from the bitstream, detects a region of interest based on the information related to the 360-degree VR service, and provides to a user a 360-degree VR image for the region of interest.

According to another aspect of the present disclosure, there may be provided a method of encoding a 360-degree image, the method including: receiving 360-degree VR image information; recognizing a region of interest of a user; and encoding information related to a 360-degree VR service, wherein the information related to the 360-degree VR service includes at least one of division information of the 360-degree VR image and information of the region of interest.

According to another aspect of the present disclosure, there may be provided an apparatus for encoding a 360-degree image, wherein the apparatus receives 360-degree VR image information, recognizes a region of interest of a user, encodes information related to a 360-degree VR service, wherein the information related to the 360-degree VR service includes at least one of division information of the 360-degree VR image, and information of the region of interest.

Mode for Invention

The present invention is described more fully hereinafter with reference to the accompanying drawings, in which embodiments of the present invention are shown. This present invention may, however, be embodied in many different forms and should not be construed as limited to the embodiments set forth herein. Rather, these embodiments are provided so that this disclosure is thorough, and will fully convey the scope of the present invention to those skilled in the art. The similar reference numerals refer to the same or similar functions in various aspects. In the drawings, the shapes and sizes of elements may be exaggerated for clarity. In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a certain feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled.

It will be understood that, although the terms including ordinal numbers such as "first", "second", etc. may be used herein to describe various elements, these elements are not limited by these terms. These terms are only used to distinguish one element from another. For example, a second element could be termed a first element without departing from the teachings of the present inventive concept, and similarly a first element could be also termed a second element. The term "and/or" includes any and all combination of one or more of the associated items listed.

When an element is referred to as being "connected to" or "coupled with" another element, it can not only be directly connected or coupled to the other element, but also it can be understood that intervening elements may be present. In contrast, when an element is referred to as being "directly connected to" or "directly coupled with" another element, there are no intervening elements present.

The components as used herein may be independently shown to represent their respective distinct features, but this does not mean that each component should be configured as a separate hardware or software unit. In other words, the components are shown separately from each other for ease of description. At least two of the components may be combined to 5 configure a single component, or each component may be split into a plurality of components to perform a function. Such combination or separation also belongs to the scope of the present invention without departing from the gist of the present invention.

Terms used in the application are merely used to describe particular embodiments and are not intended to limit the present disclosure. A singular expression includes a plural expression unless the context clearly indicates otherwise. In the application, terms such as "include" or "have" are should be understood as designating that features, number, steps, operations, elements, parts, or combinations thereof exist and not as precluding the existence of or the possibility of adding one or more other features, numbers, steps, operations, elements, parts, or combinations thereof in advance. That is, in the present invention, the contents describing the specific configuration as "including" does not exclude the configuration other than the configuration thereof, and the additional configurations may be included within the scope of the practice of the invention or the technical scope of the invention.

Some elements may not serve as necessary elements to perform an essential function in the present invention, but may serve as selective elements to improve performance. The present invention may be embodied by including only necessary elements to implement the spirit of the present invention excluding elements used to improve performance, and a structure including only necessary elements excluding selective elements used to improve performance is also included in the scope of the present invention.

Hereinbelow, reference will now be made in detail to the preferred embodiments of the present invention, examples of which are illustrated in the accompanying. In the detailed description of the preferred embodiments of the disclosure, however, detailed depictions of well known related functions and configurations may be omitted so as not to obscure the art of the present disclosure with superfluous detail. Also, the same or similar reference numerals are used throughout the different drawings to indicate similar functions or operations.

FIG. 1 is a view showing a scenario of providing a high quality 360-degree VR media service by using a broadcasting network according to an embodiment of the present disclosure.

A first scenario is a scenario for simultaneously providing 360-degree VR image services of low quality and high quality based on an image obtained by using a 360-degree VR camera. Herein, 'high quality' may mean a base resolution of media obtained from a 360-degree VR obtaining apparatus. A low quality 360-degree VR image 110 may mean an image obtained by downscaling a high quality 360-degree VR image obtained by the 360-degree VR camera to have a predetermined size. For example, when the high quality 360-degree VR image has a resolution of 16K×8K, the low quality 360-degree VR image 110 may have a resolution of 4K×2K. The resolution of 4K×2K is an example based on a resolution of a current commercial UHD TV and a head mounted display (HMD). The resolution of the low quality 360-degree VR image 110 is not limited thereto, and may vary randomly. Meanwhile, the low quality 360-degree VR image 110 may be provided for compatibility with a conventional receiver in a broadcasting environment. In addition, the low quality 360-degree VR image 110 may be used for minimizing an MTP latency according to user motion or user selection.

A high quality 360-degree VR image 120 of the present disclosure may mean a high quality image provided for a region of interest (RoI). The region of interest may be recognized by user motion or user selection. For example, the user selection may mean a user input by using an external device, but it is not limited thereto. Predetermined motion of the user for determining the region of interest may be included. The high quality 360-degree VR image 120 may be divided into sub-regions having an arbitrary size, and each sub-region may be independently encoded. Referring to FIG. 1, the high quality 360-degree VR image 120 may be divided into sub-regions based on tiles. For example, the user may watch a low quality 360-degree VR image, and provided with a high quality 360-degree VR image for a region of interest of the user, and thus the user may watch a 360-degree VR image with clearer and better image quality for the region of interest.

A second scenario is a scenario of providing of a high quality 360-degree VR image service 130 under a broadcasting environment based on the high quality 360-degree VR image 130 that is divided into sub-regions having a predetermined size and without providing a low quality 360-degree VR image. For example, the receiver may play an initial view region 132 that is played among sub-regions by performing signaling, and when user motion or user selection is input, play the corresponding sub-region in response to the input. For example, the predetermined size of the sub-region may be determined to have a constant resolution such as FHD, 4K, etc. In addition, the predetermined size may vary according to a resolution supported by a TV, or a mobile device such as HMD.

Figure 2:
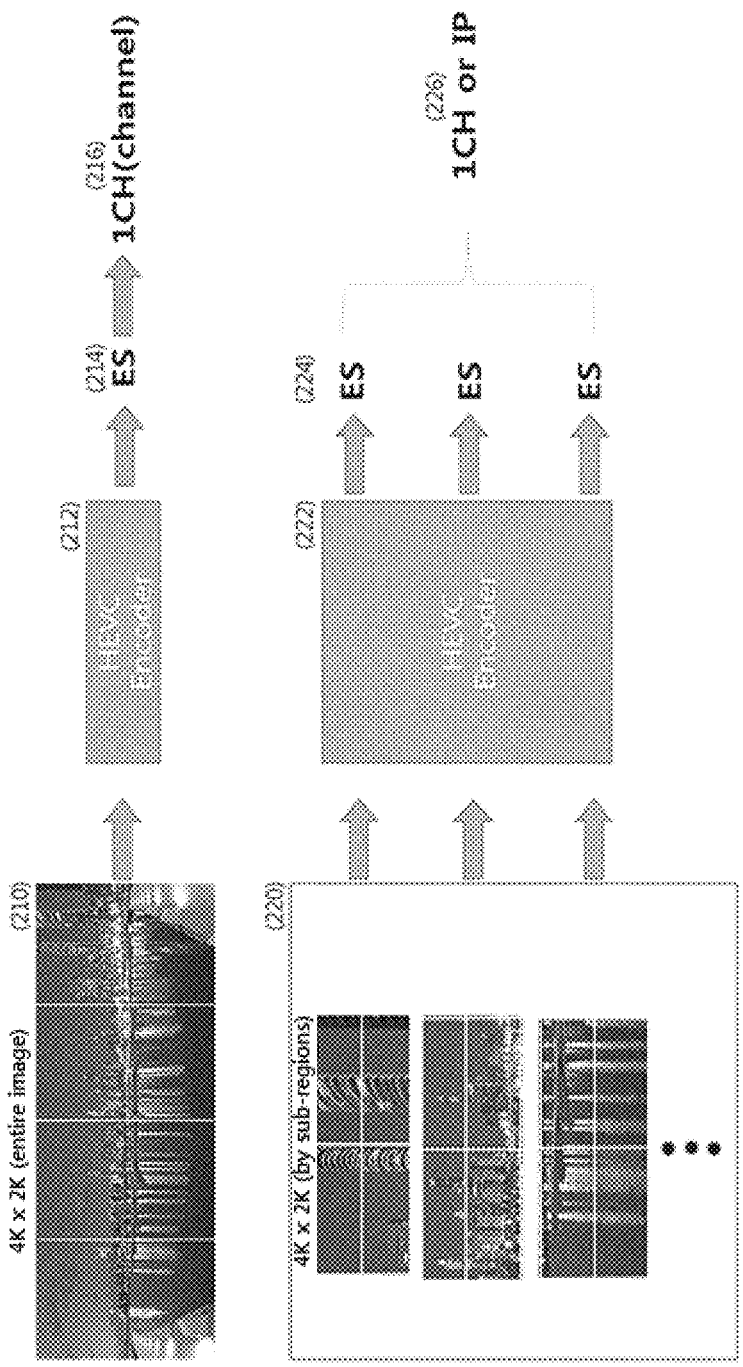
FIG. 2 is a view showing a structure of a 360-degree VR image stream transmitted through the broadcasting network according to an embodiment of the present disclosure.

FIG. 2 is a view showing a structure of a 360-degree VR image stream transmitted through the broadcasting network according to an embodiment of the present disclosure.

A low quality 360-degree VR image 210 may be encoded by an HEVC encoder 212 and transmitted by being distinguished by one of elementary stream (ES)_ID, Asset_ID or AdaptationSet ID. Alternatively, the low quality 360-degree VR image 210 may be transmitted in unique identifier information of a stream 214 that is separately encoded. The stream may mean a bitstream. ES_ID, Asset_ID, and AdaptationSet_ID may be respectively used as encoding stream unique identifier information to distinguish an encoding stream in MPEG-2 Systems, MPEG-MMT, and MPEG-DASH standard. For example, a low quality 360-degree VR image 210 may have a resolution of 4K×2K, but it is not limited thereto. The resolution may vary according to a terminal providing the image.

Meanwhile, a high quality 360-degree VR image 220 may be divided into sub-regions having a constant size. The sub-regions may be respectively encoded by an HEVC encoder 222, and transmitted by being distinguished by one of ES ID 224, Asset ID or Adaptation_set ID by sub-regions. Herein, a number of streams of the high quality 360-degree VR image 220 may vary according to a number of sub-regions. For example, the stream of the high quality 360-degree VR image 220 may have a resolution of 4K×2K, but it is not limited thereto. The resolution may vary according to a terminal providing the image. In addition, a low quality 360-degree VR image stream may be transmitted through a channel identical to a channel through which the sub-region stream of the high quality 360-degree VR image 220 is transmitted, or may be transmitted through an additional independent channel 216 for maintaining compatibility with a conventional receiver. For example, the additional independent channel may be an IP network, or an additional channel within the broadcasting network. In addition, the sub-region stream of the high quality 360-degree VR image 220 may be transmitted through one broadcasting channel by using a channel combination or may be transmitted through an IP network 226.

FIG. 3 is a view showing a signaling structure for 360-degree VR broadcasting service according to an embodiment of the present disclosure.

Referring to FIG. 3, a signaling structure for a 360-degree VR broadcasting service may include signaling information that is additionally required for distinguishing 360-degree VR image streams of low quality and high quality or for a broadcasting service.

According to an embodiment, a first signaling structure 310 is a signaling structure for distinguishing a high quality 360-degree VR broadcasting service, and may be information signaled by being applied to a program or to a service level.

VR_contents_ID may mean an identifier for distinguishing various VR images transmitted from a program or channel. In addition, VR_contents_ID may be used as unique identifier information for distinguishing VR content that is variably transmitted. In addition, VR_contents_ID may be used as information representing an actual VR content configuration. For example, the actual VR content configuration may be 2D or 3D dimensional information. VR_projectionType may mean various VR projection types. In addition, VR_projectionType may be used for remapping or restoring an image received in the receiver to a 360-degree VR image. Total_width and Total_height may respectively mean the total horizontal and vertical sizes of a high quality 360-degree VR image. Number_ROI may mean a total number of sub-regions.

In addition, according to an embodiment, a second signaling structure 320 may mean an identifier for distinguishing a low quality 360-degree VR image, and mean information signaled by being applied to an encoding stream level of each sub-region obtained by dividing a high quality 360-degree VR image stream by a predetermined size. 360-degree VR_totalview_present may be used for determining whether or not a low quality 360-degree VR image stream is present. Viewport_ID may mean an identifier for distinguishing each sub-region. For example, Viewport_ID may be used for decoding or playing a corresponding sub-region according to user motion or user selection. Initial_viewport_flag may be used for identifying a sub-region that is played first in a TV or in a terminal such as HDM when a service is provided based on sub-regions without providing a low quality 360-degree VR image as the second scenario described in FIG. 1. RoI_x_startposition and RoI_x_endposition may respectively mean horizontal starting coordinates and horizontal ending coordinates for each sub-region. RoI_y_startposition and RoI_y_endposition may respectively mean vertical starting coordinates and vertical ending coordinates for each sub-region. A position of a sub-region within the entire VR image may be known based on the horizontal/vertical starting coordinates and the horizontal/vertical ending coordinates.

Meanwhile, signaling information constituting the first signaling structure 310 or the second signaling structure 320 or both may be used by being transformed into various forms, in addition to the above structure, such as metadata, XML, etc.

Figure 4:
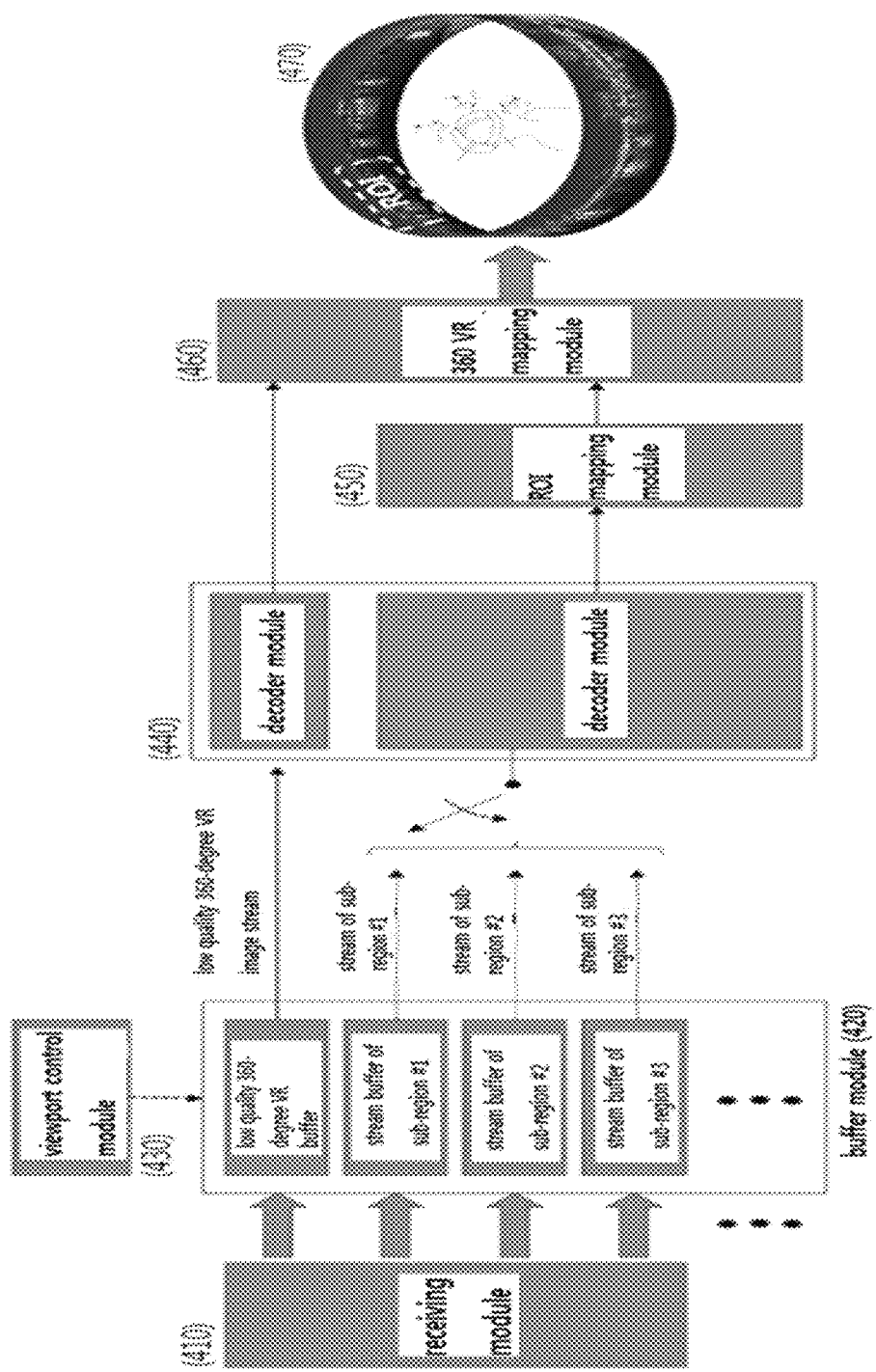
FIG. 4 is a view showing a configuration of a high quality 360-degree VR image processing apparatus according to an embodiment of the present disclosure.

FIG. 4 is a view showing a configuration of a high quality 360-degree VR image processing apparatus according to an embodiment of the present disclosure.

A high quality 360-degree VR image processing apparatus may include a 360-degree VR image encoding apparatus or decoding apparatus or both. In addition, a 360-degree VR image may be transmitted through a broadcasting network or through two types of networks including a broadcasting network and an IP network.

Referring to FIG. 4, a high quality 360-degree image processing apparatus 400 may include at least one of a receiving module 410, a buffer module 420, a viewport control module 430, a decoder module 440, an RoI mapping module 450, and a 360 VR mapping module 460. However, the figure shows only some of the components necessary for describing the present embodiment, constituent elements of the high quality 360-degree image processing apparatus 400 are not limited to the above example.

The receiving module 410 may receive a stream transmitted based on various standard regulations, and perform analysis of signaling information described in FIG. 3 and control information related to provide a 360-degree VR service. In addition, the receiving module 410 may separate a 360-degree VR stream based on a low quality or a sub-region or both, and transfer the separated 360-degree VR stream to a corresponding buffer. The buffer module 420 may perform buffering for the stream transmitted from the receiving module 410. In addition, the buffer module 420 may perform synchronization based on a decoding time stamp (DTS) or a presentation time stamp (PTS) of each stream. For example, when providing a 360-degree VR service, playing a scene synchronized according to user motion is required, and the buffer module 420 may perform synchronization by frames based on a DTS or a PTS. Herein, a low quality 360-degree VR stream may be transmitted to a corresponding device in an IP stream under an IP environment for providing compatibility with a conventional terminal such as HMD.

The viewport control module 430 may extract a corresponding stream according to user motion or user selection based on a TV or a terminal such as HMD. In addition, the viewport control module 430 may transmit the extracted stream to the decoder module 440. For example, the viewport control module 430 may transmit a low quality 360-degree VR image stream and a sub-region stream extracted by the viewport control module 430 to the decoder module 440. Herein, user motion information, user selection information, or regional information according to user motion or selection may be received under an IP environment. A sub-region stream may be mapped based on a low quality 360-degree VR stream, and may be used for providing a high quality image for a region that the user watches later. Meanwhile, the buffer module 420 may perform frame synchronization for sub-region streams that are not extracted by the viewport control module 430 based on a DTS or a PTS or both. In addition, the buffer module 420 may continuously drop a corresponding packet by performing synchronization. Decoding of a low quality 360-degree VR image stream may be continuously performed, while decoding of a sub-region stream may be dependent on a region of interest of the user. As the buffer module 420 performs synchronization for the entire stream, the high quality 360-degree VR image processing apparatus may provide a region of interest of high quality by minimizing an MTP latency generated according to user motion through an actual terminal such as HMD. In other words, the high quality 360-degree VR image processing apparatus may play a region of interest based on a low quality 360-degree VR image stream when the region of interest has been changed, and perform decoding of a sub-region stream corresponding to the selection of the region of interest.

The RoI mapping module 450 may re-adjust a sub-region stream extracted by the viewport control module 430 to a stream suitable for a resolution supported by a terminal such as HMD. The 360 VR mapping module 460 may perform mapping for a sub-region stream for a region of interest based on user motion or user selection and a low quality 360-degree VR image stream. In addition, the 360 VR mapping module 460 may transmit a mapping result 470 to a TV or a terminal such as HMD 470.

Figure 5:
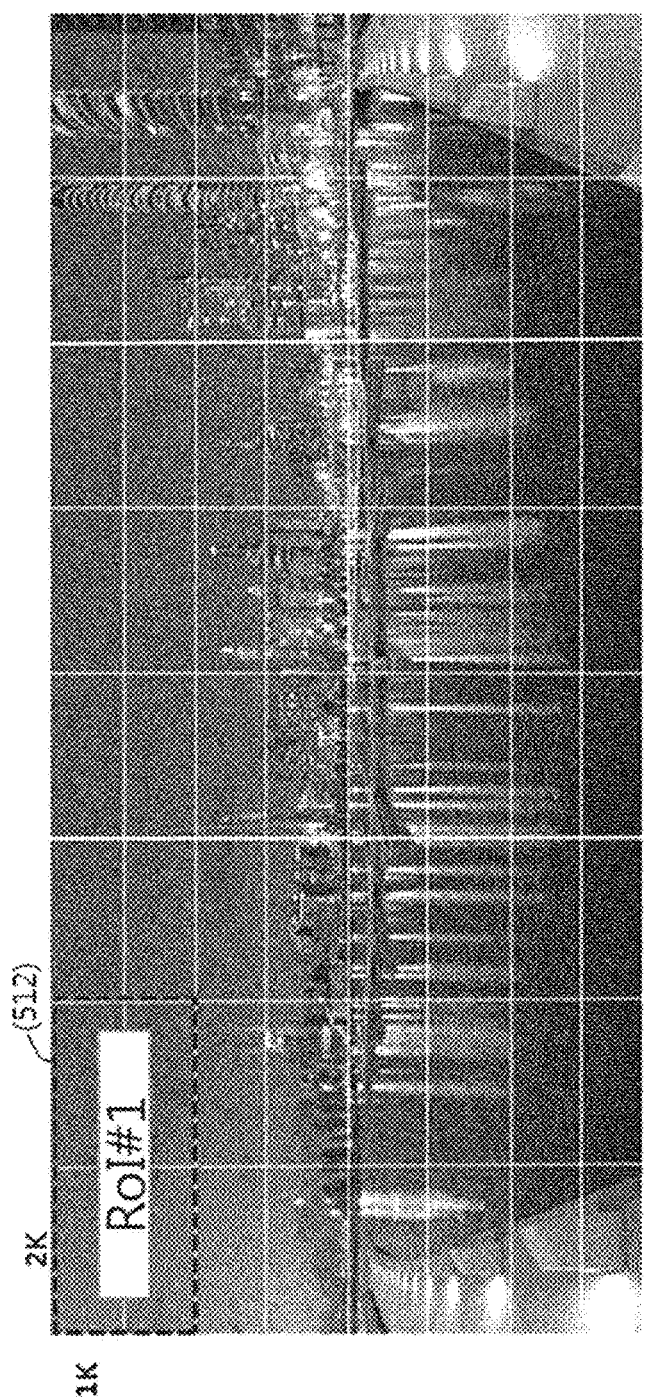
FIG. 5 is a view showing a process of providing a high quality 360-degree image of a region of interest (RoI) according to an embodiment of the present disclosure.

FIG. 5 is a view showing a process of providing a high quality 360-degree image for a region of interest (RoI) according to an embodiment of the present disclosure.

The high quality 360-degree VR image processing apparatus of the present disclosure may decode a sub-region stream included in a region of interest 512, and transfer the decoded stream to the 360 VR mapping module. The region of interest 512 may be detected by user motion or user selection. Referring to FIG. 5, a resolution of the extracted sub-region stream may have a horizontal resolution of 4K. For example, when a terminal such as HMD supports a horizontal resolution of 4K for a region of interest, a resolution of the extracted sub-region stream is identical to a resolution supported for a region of interest in a terminal such as HMD, and thus the high quality 360-degree VR image processing apparatus may transfer the extracted sub-region stream to the 360 VR mapping module of FIG. 4 without performing an additional process.

Figure 6:
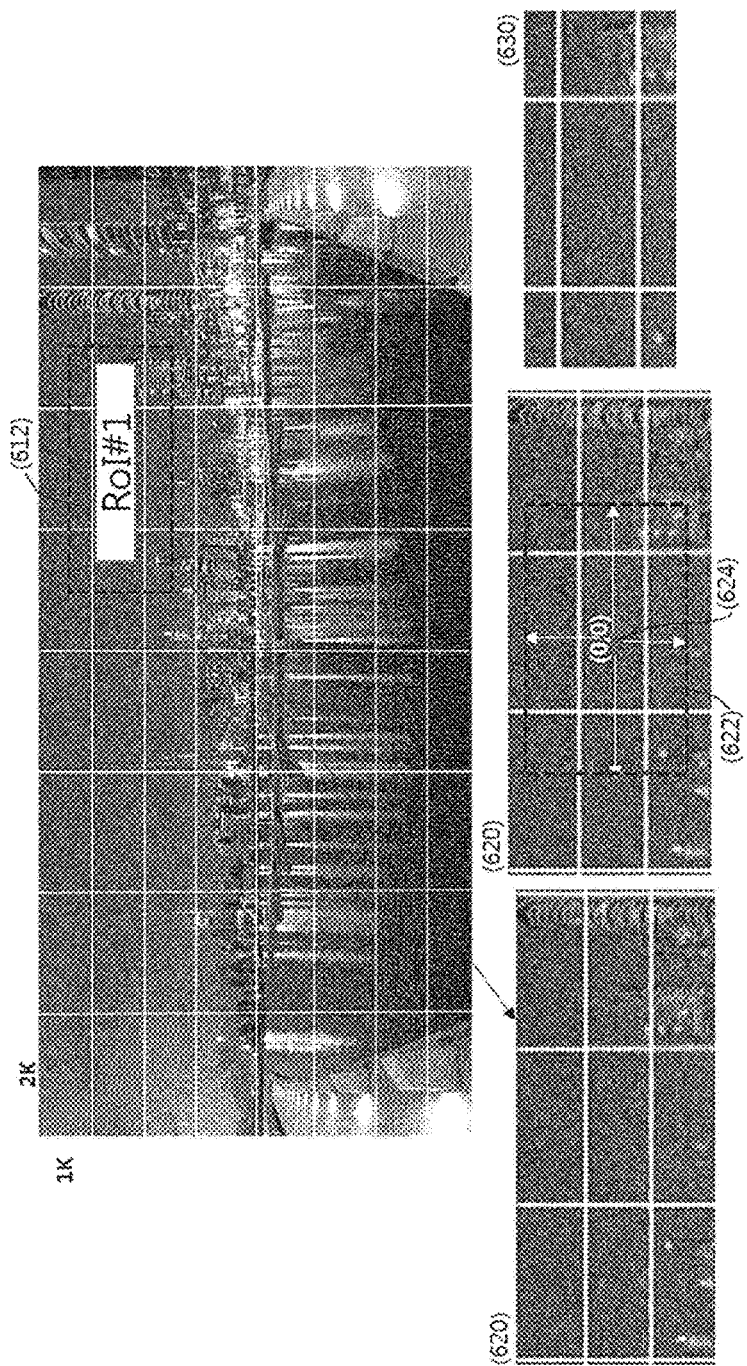
FIG. 6 is a view showing a process of providing a high quality 360-degree image of a region of interest (RoI) according to another embodiment of the present disclosure.

FIG. 6 is a view showing a process of providing a high quality 360-degree image for a region of interest (RoI) according to another embodiment of the present disclosure.

The high quality 360-degree VR image processing apparatus may decode a sub-region stream included in a region of interest 612 for the region of interest 612, and transfer the decoded stream to the 360 VR mapping module. The region of interest 612 may be determined by user motion or user selection. In FIG. 6, as FIG. 5, a terminal such as HMD supports a horizontal resolution of 4K for a region of interest. Referring to FIG. 6, different to FIG. 5, the region of interest 612 is positioned on nine sub-region streams, that is, on a sub-region stream having a horizontal resolution of 4K or more, and thus a process of re-adjusting a region is required. For example, when the region of interest 612 is selected as FIG. 6, the total of nine sub-region streams included in the region of interest 612 may be all decoded, but re-adjusting a size of a region that is decoded to be played in a terminal such as HMD may be required. In other words, the high quality 360-degree VR image processing apparatus may continuously decode the total of nine sub-region streams positioned at the region of interest 612. In addition, the high quality 360-degree VR image processing apparatus may detect a region of interest based on a center of a region corresponding to a region of interest 622 in the decoded partial image 620. For example, the high quality 360-degree VR image processing apparatus may set center coordinates 624 of a region corresponding to region of interest 622 in the decoded partial image 620 as (0,0), and extract a region corresponding to 2K to the left, 2K to the right, 1K to the upper side, and 1K to the low side, in a total of 4K by using the center coordinates. The high quality 360-degree VR image processing apparatus may transmit the finally extracted region of interest 630 to the 360 VR mapping module. Meanwhile, when user motion is performed within the decoded nine sub-regions, the high quality 360-degree VR image processing apparatus may extract a region of interest when performing re-adjusting the sub-region within the decoded nine images.

Figure 7:
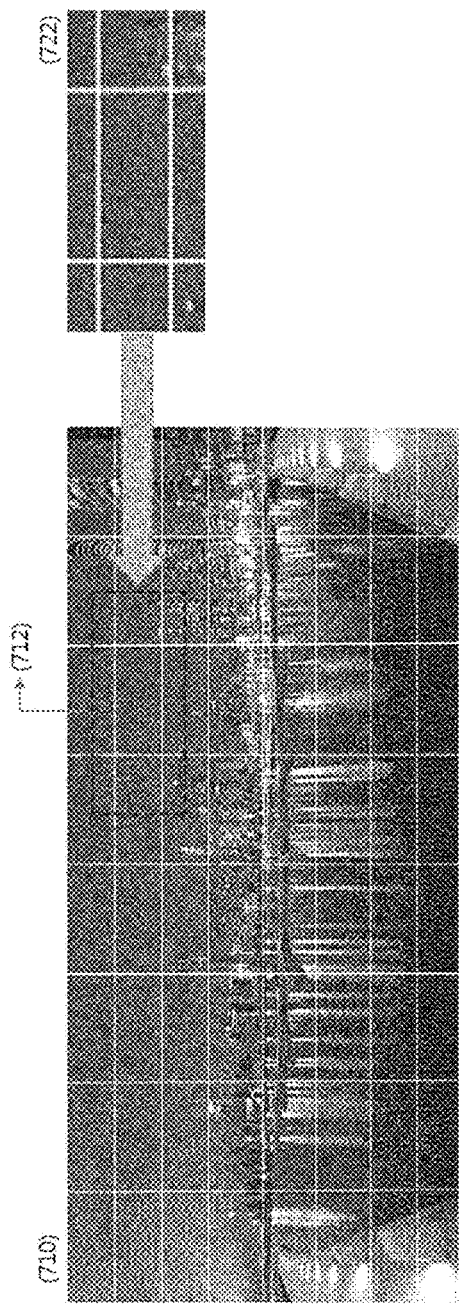
FIG. 7 is a view showing a process of providing a high quality 360-degree VR image of a region of interest of a user in a low quality 360-degree VR image according to an embodiment of the present disclosure.

FIG. 7 is a view showing a process of providing a high quality 360-degree VR image for a region of interest of a user in a low quality 360-degree VR image according to an embodiment of the present disclosure.

Referring to FIG. 7, a user may watch a low quality 360-degree VR image 710, and a region of interest 712 may be determined according to user motion or user selection. The high quality 360-degree VR image processing apparatus may perform mapping between the determined region of interest 712 and a region of interest 722 that is re-adjusted on a high quality sub-region stream. Meanwhile, according to a relation between the region of interest 712 and a sub-region of the high quality image, each process described in FIG. 5 or FIG. 6 may be performed. In addition, the high quality 360-degree VR image processing apparatus may transmit a result image obtained by performing mapping for the high quality re-adjusted region of interest 722 to a TV or a terminal such as HMD.

According to the present disclosure, in a broadcasting service environment, a view according to viewer motion or selected by the viewer is provided in a resolution of 4K or more, and a high quality 360-degree VR image processing apparatus capable of minimizing an MTP latency through an in-house TV or a mobile device such as HMD may be provided.

In addition, according to the present disclosure, a receiving apparatus and method based on a region of interest selected by a user and which provides signaling information for a 360-degree VR broadcasting service may be provided.

In addition, according to the present disclosure, an apparatus and method of minimizing an MTP latency while proving a region of interest of high quality according to user motion or user selection for high quality 360-degree VR media under a broadcasting network environment may be provided.

In addition, according to the present disclosure, an apparatus and method of providing a high quality 360-degree VR broadcasting service to a viewer by using various broadcasting networks such as ground TV, cable TV, etc. may be provided The above embodiments may be performed in a high quality 360-degree VR image encoding apparatus and a high quality 360-degree VR image decoding apparatus in the same method.

Orders applying the above embodiments may vary in a high quality 360-degree VR image encoding apparatus and in a high quality 360-degree VR image decoding apparatus. Alternatively, the order applying the above embodiments may be identical in a high quality 360-degree VR image encoding apparatus and in a high quality 360-degree VR image decoding apparatus.

The above embodiments may be performed in a high quality 360-degree VR image encoding apparatus and in a high quality 360-degree VR image decoding apparatus in the same method.

For luma and chroma signals, the above may be respectively performed, and the embodiment may be identically performed for the luma and chroma signals.

In the above-described embodiments, the methods are described based on the flowcharts with a series of steps or units, but the present invention is not limited to the order of the steps, and rather, some steps may be performed simultaneously or in different order with other steps. It should be appreciated by one of ordinary skill in the art that the steps in the flowcharts do not exclude each other and that other steps may be added to the flowcharts or some of the steps may be deleted from the flowcharts without influencing the scope of the present invention.

Further, the above-described embodiments include various aspects of examples. Although all possible combinations to represent various aspects cannot be described, it may be appreciated by those skilled in the art that any other combination may be possible. Accordingly, the present invention includes all other changes, modifications, and variations belonging to the following claims.

The embodiments of the present invention can be implemented in a form of executable program command through a variety of computer means recordable to computer readable media. The computer readable media may include solely or in combination, program commands, data files and data structures. The program commands recorded to the media may be components specially designed for the present invention or may be usable to a skilled person in a field of computer software. Computer readable recording media includes magnetic media such as hard disk, floppy disk, magnetic tape, optical media such as CD-ROM and DVD, magneto-optical media such as optical disk and hardware devices such as ROM, RAM and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

While the invention has been shown and described with respect to the preferred embodiments, it will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

The invention claimed is:

1. A method of decoding a 360-degree image, the method comprising:
   receiving a bitstream including 360-degree virtual reality (VR) image information;
   obtaining respectively a first 360-degree VR image having a first resolution and a second 360-degree VR image having a second resolution higher than the first resolution;
   decoding first signaling information and second signaling information related to a 360-degree VR service from the bitstream;
   detecting a region of interest based on the first signaling information and second signaling information; and
   providing to a user an image for the region of interest from at least one of the first 360-degree VR image and the second 360-degree VR image, based on whether the region of interest is being changed or the region of interest is selected,
   wherein the first signaling information is applied to a program or to a service level, and
   wherein the second signaling information is applied to a stream level of each of a plurality of sub-regions generated by dividing the second 360-degree VR image.

2. The method of claim 1, wherein the first signaling information includes projection type information used to perform mapping the first 360-degree image and the second 360-degree image, and division information indicating a number of the plurality of sub-regions.

3. The method of claim 1, wherein the second signaling information includes first 360-degree image selection information indicating whether or not to provide the first 360-degree image to the user, and identification information about at least one of the plurality of sub-regions to be provided firstly to the user.

4. The method of claim 1, wherein a size of the image for the region of interest is re-adjusted to be suitable for providing to the user.

5. The method of claim 1, when the region of interest is being changed, wherein the image for the region of interest is provided to the user by performing mapping the first 360-degree image and at least one of the plurality of sub-regions corresponding to the region of interest.

6. The method of claim 1, when the region of interest is selected, wherein the image for the region of interest is provided to the user from at least one sub-region corresponding to the region of interest among the plurality of sub-regions, without the first 360-degree VR image.

7. An apparatus for decoding a 360-degree image, the apparatus comprising:
   a receiving module receiving a bitstream including 360-degree VR image information;
   a buffer module obtaining respectively a first 360-degree VR image having a first resolution and a second 360-degree VR image having a second resolution higher than the first resolution;
   a viewport control module extracting an image for a region of interest from a plurality of sub-regions of the second 360-degree image, based on at least one of motion information of a user and an input of the user, the plurality of sub-regions are generated by dividing the second 360-degree image;
   a decoder module decoding signaling information related to a 360-degree VR service, the first 360-degree image and the image for the region of interest;
   an RoI mapping module re-adjusting a size of the image for the region of interest, based on a resolution information supported by a terminal of the user; and
   a 360-degree VR mapping module performing mapping the image for the region of interest and the first 360-degree VR image, based on whether the region of interest is being changed or the region of interest is selected.

8. The apparatus of claim 7, the signaling information includes first signaling information being applied to a program or to a service level, and second signaling information being applied to a stream level of each of a plurality of sub-regions generated by dividing the second 360-degree VR image.

9. The apparatus of claim 8, wherein the first signaling information includes projection type information used to perform mapping the first 360-degree image and the second 360-degree image, and division information indicating a number of the plurality of sub-regions.

10. The apparatus of claim 8, wherein the second signaling information includes first 360-degree image selection information indicating whether or not to provide the first 360-degree image to the user.

11. The apparatus of claim 10, when the first 360-degree image is not provided to the user, wherein the second signaling information further includes identification information about at least one of the plurality of sub-regions to be provided firstly to the user.

12. The apparatus of claim 8, wherein the viewport control module extracts the image for the region of interest as at least one of a plurality of sub-regions of the second 360-degree VR image.

13. The method of claim 1, wherein the obtained first 360-degree VR image and the obtained second 360-degree VR image are synchronized based on at least one of a decoding time stamp (DTS) and a presentation time stamp (PTS).

14. The apparatus of claim 7, wherein the buffer module synchronizes the obtained first 360-degree image and the obtained second 360-degree image, based on at least one of a decoding time stamp (DTS) and a presentation time stamp (PTS).

15. The apparatus of claim 7, when the region of interest is selected, wherein the 360-degree VR mapping module outputs the image for the region of interest without performing mapping with the first 360-degree VR image.

16. A method of encoding a 360-degree image, the method comprising:
   receiving 360-degree VR image information related to a first 360-degree VR image having first resolution and a second 360-degree VR image having second resolution higher than the first resolution;
   recognizing a region of interest of a user; and
   encoding the first 360-degree VR image, the second 360-degree VR image, first signaling information used to distinguish the first 360-degree VR image and the second 360-degree VR image, and second signaling information used to provide an image for the region of interest,
   wherein the second 360-degree VR image is divided into a plurality of sub-regions, and at least one of the plurality of sub-regions for the region of interest is encoded and output through one or more channels, wherein the first signaling information is applied to a program or to a service level, and wherein the second signaling information is applied to a stream level of each of the plurality of sub-regions.

17. The method of claim 16, wherein the first signaling information includes projection type information used to perform mapping the first 360-degree image and the second 360-degree image, and division information indicating a number of the plurality of sub-regions, and wherein the second signaling information includes first 360-degree image selection information indicating whether or not to provide the first 360-degree image to the user, and identification information about at least one of the plurality of sub-regions to be provided firstly to the user.

18. The method of claim 16, when the first 360-degree image is not provided to the user, wherein the second signaling information further includes identification information about at least one of the plurality of sub-regions to be provided firstly to the user.

19. An apparatus for encoding a 360-degree image, wherein the apparatus receives 360-degree VR image information related to a first 360-degree VR image having first resolution and a second 360-degree VR image having second resolution higher than the first resolution, recognizes a region of interest of a user, encodes the first 360-degree VR image, the second 360-degree VR image, first signaling information used to distinguish the first 360-degree VR image and the second 360-degree VR image, and second signaling information used to provide an image for the region of interest to the user, wherein the second 360-degree VR image is divided into a plurality of sub-regions, and at least one of the plurality of sub-regions for the region of interest is encoded and output through one or more channels, wherein the first signaling information is applied to a program or to a service level, and wherein the second signaling information is applied to a stream level of each of the plurality of sub-regions.

20. The apparatus of claim 19, wherein the first signaling information includes projection type information used to perform mapping the first 360-degree image and the second 360-degree image, and division information indicating a number of the plurality of sub-regions, and wherein the second signaling information includes first 360-degree image selection information indicating whether or not to provide the first 360-degree image to the user.

21. The apparatus of claim 19, when the first 360-degree image is not provided to the user, wherein the second signaling information further includes identification information about at least one of the plurality of sub-regions to be provided firstly to the user.

* * * * *